US012064969B2

(12) United States Patent
Yamada et al.

(10) Patent No.: US 12,064,969 B2
(45) Date of Patent: Aug. 20, 2024

(54) LIQUID EJECTION HEAD AND LIQUID EJECTION APPARATUS

(71) Applicant: CANON KABUSHIKI KAISHA, Tokyo (JP)

(72) Inventors: Kazuhiro Yamada, Yokohama (JP); Yoshiyuki Nakagawa, Kawasaki (JP); Toru Nakakubo, Kawasaki (JP); Ryo Kasai, Tokyo (JP); Takuro Yamazaki, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/142,431

(22) Filed: May 2, 2023

(65) Prior Publication Data

US 2023/0264478 A1 Aug. 24, 2023

Related U.S. Application Data

(60) Continuation of application No. 17/362,492, filed on Jun. 29, 2021, now Pat. No. 11,673,396, which is a (Continued)

(30) Foreign Application Priority Data

Dec. 28, 2018 (JP) ................................ 2018-248110

(51) Int. Cl.
*B41J 2/175* (2006.01)
*B41J 2/14* (2006.01)
*B41J 2/16* (2006.01)

(52) U.S. Cl.
CPC ........... *B41J 2/175* (2013.01); *B41J 2/14233* (2013.01); *B41J 2/1631* (2013.01)

(58) Field of Classification Search
CPC ...... B41J 2/175; B41J 2/14233; B41J 2/1631; B41J 2202/12; B41J 2202/20; B41J 2202/21; B41J 2/1404; B41J 2/18
See application file for complete search history.

(56) References Cited

U.S. PATENT DOCUMENTS 6,244,694 B1 6/2001 Weber et al.
9,254,658 B2 2/2016 Yamada et al.
(Continued)

FOREIGN PATENT DOCUMENTS

JP 2013-539724 A 10/2013
JP 2016-179599 A 10/2016
(Continued)

OTHER PUBLICATIONS

IP.com search (Year: 2023).
(Continued)

*Primary Examiner* — Lisa Solomon
(74) *Attorney, Agent, or Firm* — Venable LLP

(57) ABSTRACT

A liquid ejection head includes a print element substrate including multiple ejection openings, pressure chambers, a common flow path, and pumps, the pumps being configured to circulate liquid between the common flow path and the pressure chamber; and a flow path member laminated to the print element substrate. The flow path member includes a supply flow path and a collection flow path, the supply flow path being configured to supply liquid to the print element substrate, and the collection flow path being configured to collect liquid that is not ejected. The supply flow path and the collection flow path have liquid connection with the same common flow path. A circulating pump generates a flow of liquid flowing in an order of the supply flow path, the common flow path, and the collection flow path, the circulating pump being provided at a position different from the print element substrate.

8 Claims, 6 Drawing Sheets

Related U.S. Application Data division of application No. 16/710,367, filed on Dec. 11, 2019, now Pat. No. 11,065,878.

(56) References Cited

U.S. PATENT DOCUMENTS

| | | | |
|---|---|---|---|
| 9,724,926 | B2 | 8/2017 | Keefe et al. |
| 9,821,553 | B2 | 11/2017 | Yamamoto et al. |
| 10,300,707 | B2 | 5/2019 | Nakakubo et al. |
| 10,538,087 | B2 | 1/2020 | Nakagawa et al. |
| 10,632,743 | B2 | 4/2020 | Govyadinov et al. |
| 10,974,504 | B2 | 4/2021 | Yamazaki et al. |
| 2017/0197417 | A1 | 7/2017 | Karieta et al. |
| 2019/0001692 | A1* | 1/2019 | Yamazaki ................ B41J 29/02 |
| 2019/0009554 | A1 | 1/2019 | Nakagawa |
| 2019/0023016 | A1 | 1/2019 | Nakagawa et al. |
| 2019/0023018 | A1 | 1/2019 | Nakagawa et al. |
| 2019/0092012 | A1 | 3/2019 | Morisue et al. |
| 2020/0009864 | A1 | 1/2020 | Morisue et al. |
| 2020/0207086 | A1 | 7/2020 | Nakagawa et al. |
| 2020/0207093 | A1 | 7/2020 | Nakakubo et al. |
| 2020/0254758 | A1 | 8/2020 | Hammura et al. |

FOREIGN PATENT DOCUMENTS

| | | | |
|---|---|---|---|
| JP | 2017-144634 | A | 8/2017 |
| JP | 2017-170784 | A | 9/2017 |
| JP | 2017-226209 | A | 12/2017 |
| JP | 2017-537000 | A | 12/2017 |
| WO | 2012/015397 | A1 | 2/2012 |
| WO | 2018-208276 | A1 | 11/2018 |

OTHER PUBLICATIONS

IP.com search #2 (Year: 2023).
Office Action dated Nov. 29, 2022, in Japanese Patent Application No. 2018-248110.

* cited by examiner

LIQUID EJECTION HEAD AND LIQUID EJECTION APPARATUS

BACKGROUND OF THE DISCLOSURE

Field of the Disclosure

The present disclosure relates to a liquid ejection head and a liquid ejection apparatus.

DESCRIPTION OF THE RELATED ART

In a liquid ejection head used in a liquid ejection apparatus that ejects liquid such as ink, there is a possibility that ejection failure or concentration change occurs due to liquid thickening or precipitation of solid components in the vicinity of an ejection opening. In addition, bubbles or foreign substances may remain in the vicinity of an ejection opening. As a measure to attend to such problems, as disclosed in International Laid Open Publication No. WO 2012/015397 (hereinafter referred to as Document 1), there is a proposition of a technique in which a micropump for flowing liquid is provided inside a print element substrate so as to flow ink into a pressure chamber of the print element substrate by use of the micropump. Document 1 discloses a technique in which a micropump is incorporated in a nozzle flow path of a print element substrate and, by driving the micropump, an ink circulatory flow passing through a pressure chamber is generated. Further, in Document 1, each nozzle flow path of the print element substrate has liquid connection with one flow path (liquid slot) formed in a flow path member, which is laminated to the print element substrate, so that liquid is supplied from the flow path to each nozzle flow path.

In such a liquid ejection head as disclosed in Document 1, in a case where a stopped state lasts for a long period of time, an ink concentration area proceeds to a flow path positioned in the upstream of a circulation flow path of the micropump due to moisture evaporation from an ejection opening. Even in a case where the micropump is driven in such a state, there is a problem that ink concentration at an ejection opening is not decreased and the effect by circulation cannot be obtained.

SUMMARY OF THE DISCLOSURE

A liquid ejection head according to an embodiment of the present disclosure includes: an element substrate including a plurality of ejection openings, pressure chambers, a common flow path, and first pumps, the plurality of ejection openings being configured to eject liquid, the pressure chamber being internally provided with an element configured to generate energy utilized for ejecting liquid from the ejection openings, the common flow path being configured to communicate with the plurality of ejection openings, the first pumps being configured to circulate liquid between the common flow path and the pressure chamber; and a flow path member laminated to the element substrate in a laminated direction, wherein the flow path member includes a supply flow path and a collection flow path, the supply flow path being configured to supply liquid to the element substrate, the collection flow path being configured to collect liquid that is not ejected, wherein the supply flow path and the collection flow path have liquid connection with a same common flow path, and wherein a second pump generates a flow of liquid flowing in an order of the supply flow path, the common flow path, and the collection flow path, the second pump being provided at a position different from the element substrate.

Further features of the present disclosure will become apparent from the following description of exemplary embodiments with reference to the attached drawings.

DESCRIPTION OF THE EMBODIMENTS

Hereinafter, an explanation is given of a liquid ejection head and a liquid ejection apparatus according to an embodiment of the present disclosure with reference to the drawings. An example of the liquid ejection head is a liquid ejection head that ejects ink. An example of the liquid ejection apparatus is an inkjet printing apparatus. Examples of the liquid ejection head and the liquid ejection apparatus are not limited thereto. The liquid ejection head and the liquid ejection apparatus can be applied to an apparatus, such as a printer, a copying machine, a facsimile machine having a communication system, or a word processor having a printer unit, and to a complex industrial printing apparatus combined with various processing apparatuses. For example, the liquid ejection head and the liquid ejection apparatus can be utilized for biochip fabrication and printing of electronic circuits, etc.

First Embodiment

<Configurations of Liquid Ejection Apparatus and Liquid Ejection Head>

Figure 1:
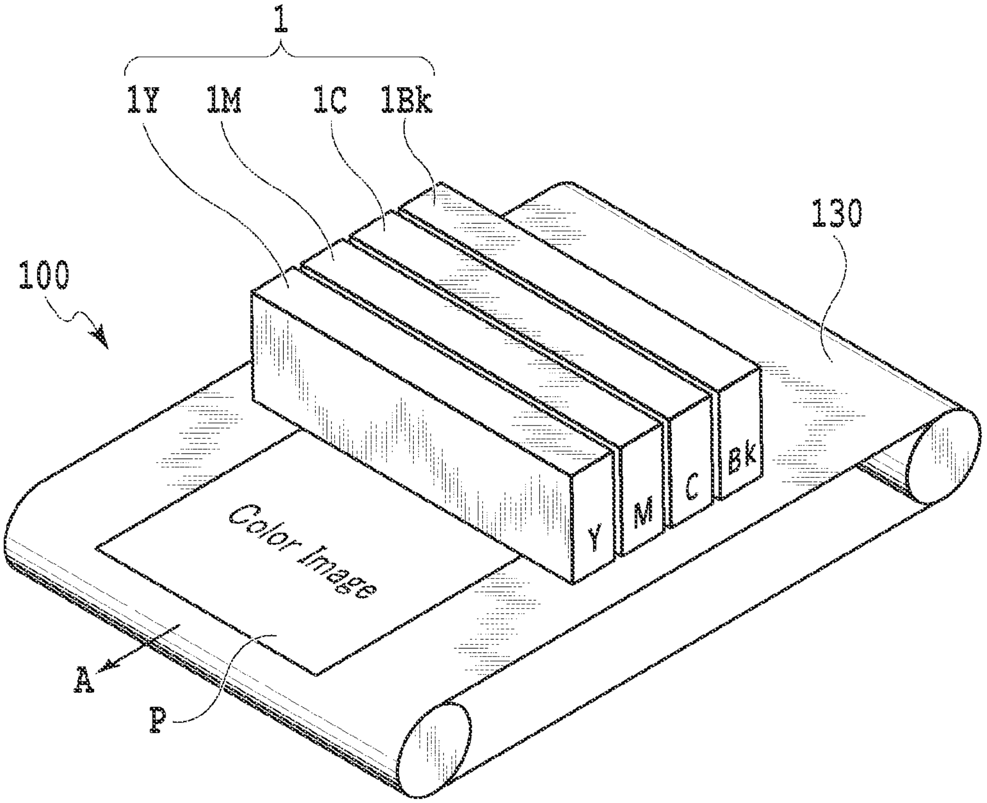
FIG. 1 is a schematic perspective view for explaining a configuration example of a liquid ejection apparatus.

FIG. 1 is a schematic perspective view for explaining a configuration example of a liquid ejection apparatus 100 using a liquid ejection head 1. The liquid ejection apparatus 100 is what is termed a full-line type in which a long liquid ejection head 1 extending over the whole area in the width direction of a print medium P is used. A print medium P is continuously conveyed in the direction of arrow A by a conveyance mechanism 130 in which a conveyance belt, or the like, is used. An image is printed on a print medium P by ejecting ink (liquid) from the liquid ejection head 1 while the print medium P is conveyed in the direction of arrow A. In the case of the present embodiment, it is possible to print a color image by using each of the liquid ejection heads 1C, 1M, 1Y, and 1Bk that eject inks of cyan (C), magenta (M), yellow (Y), and black (K), respectively, as a liquid ejection head 1.

Figure 2:
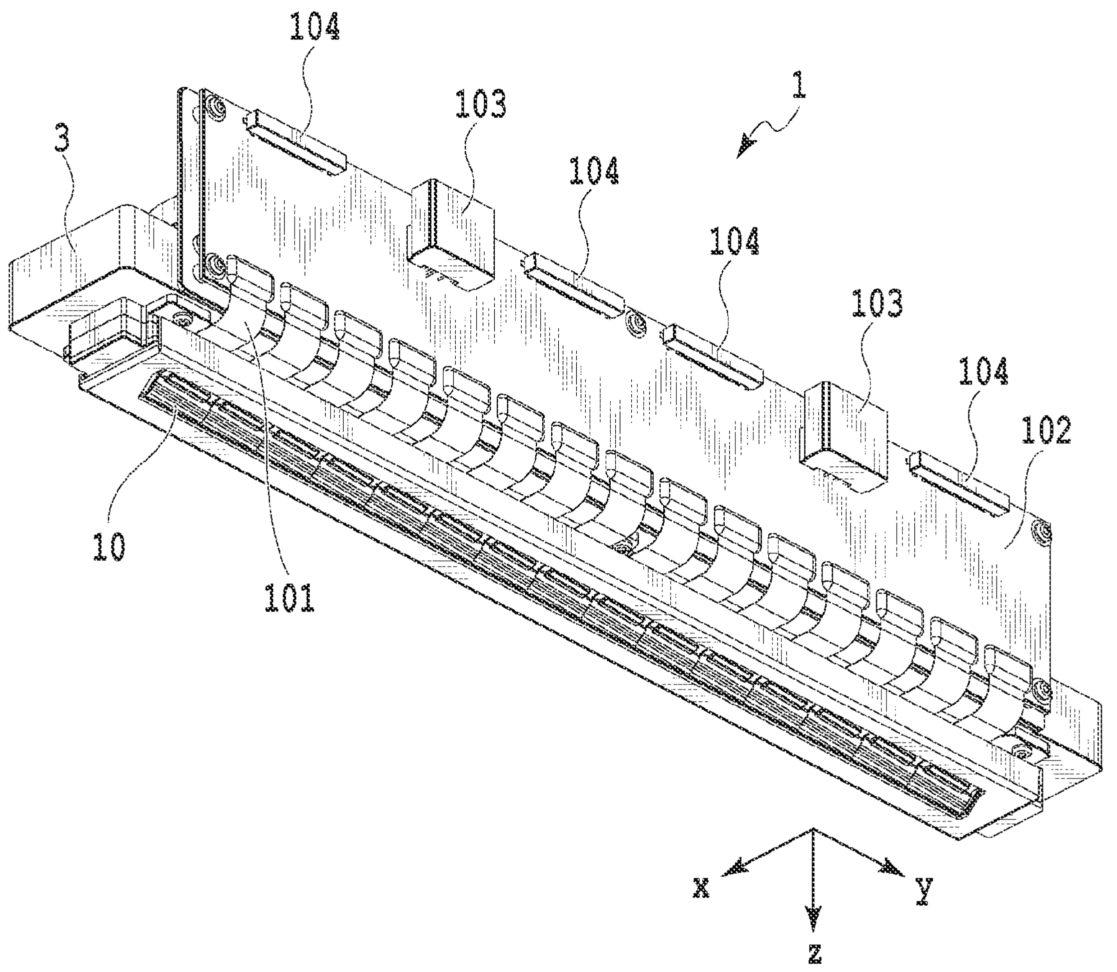
FIG. 2 is a perspective view of a liquid ejection head.

FIG. 2 is a perspective view of the liquid ejection head 1. The liquid ejection head 1 is configured such that multiple print element substrates 10, each of which includes multiple print elements aligned in y-direction, are further aligned in y-direction. Here, a full-line type liquid ejection head 1, which is configured with print element substrates 10 aligned in y-direction for a distance corresponding to the width of A4 size, is illustrated.

Each of the print element substrates 10 is connected to the same electric wiring substrate 102 via a flexible wiring substrate 101. The electric wiring substrate 102 is provided with a power supply terminal 103 for receiving power and a signal input terminal 104 for receiving an ejection signal. On the other hand, the ink supply unit 3 includes a circulation flow path formed for supplying ink, which is supplied from an ink tank (not illustrated in FIG. 2), to each of the print element substrates 10 and for collecting ink that has not been consumed in printing.

Each of the print elements arranged on a print element substrate 10 ejects, in z-direction of FIG. 2, ink supplied from the ink supply unit 3 using power supplied from the power supply terminal 103 based on an ejection signal input from the signal input terminal 104.

<Explanation of Circulation Path>

Figure 3:
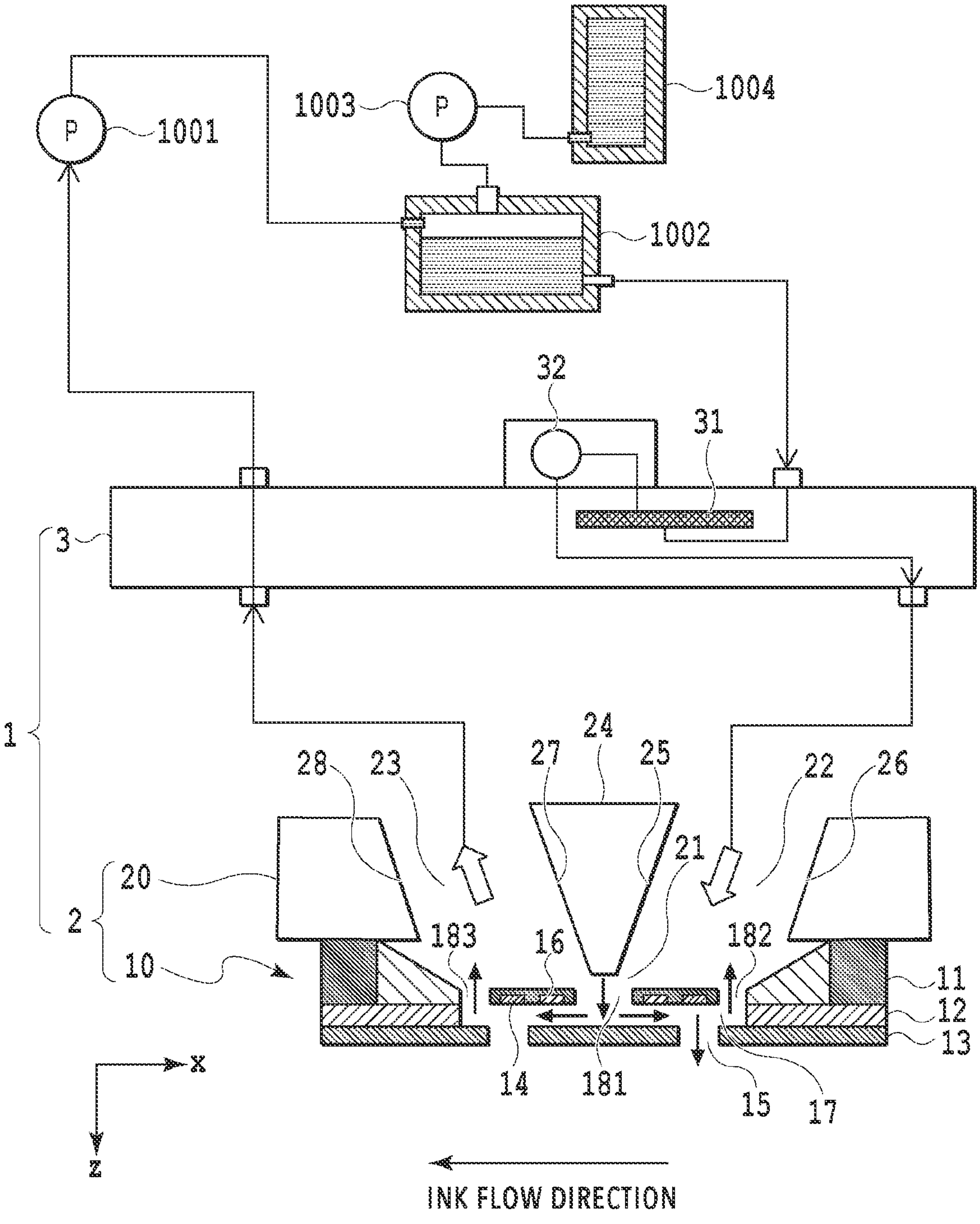
FIG. 3 is a schematic view illustrating a liquid ejection head and an ink circulation path.

FIG. 3 is a diagram for explaining an ink circulation path of an entire liquid ejection apparatus 100 including a liquid ejection head 1. FIG. 3 is a schematic view illustrating an ink path (ink channel) corresponding to one color in the liquid ejection head 1. The liquid ejection head 1 is connected to a circulating pump 1001 and a buffer tank 1002. In FIG. 3, an ink path for only one color is illustrated. However, in reality, circulation paths for the number of colors of the liquid ejection heads 1 are provided in the liquid ejection heads 1 and the liquid ejection apparatus 100.

The buffer tank 1002 is a reservoir portion for reserving ink. The buffer tank 1002 includes an outside air communication hole (not illustrated in FIG. 3), so that it is possible to discharge bubbles in the ink to the outside. The buffer tank 1002 is also connected to a replenishing pump 1003. In a case where ink is consumed by the liquid ejection head 1 due to print operation and suction recovery, etc., the replenishing pump 1003 transfers the consumed amount of ink from the main tank 1004 to the buffer tank 1002.

The circulating pump 1001 has a function of pulling ink from the liquid ejection head 1 to return the ink to the buffer tank 1002 as well as a function of applying a pressure reducing force (vacuuming force) to the negative pressure control unit 32 from the downstream side of the circulation path. As the circulating pump 1001 and the replenishing pump 1003, a syringe pump, a tube pump, a diaphragm pump, a gear pump, or the like, can be used, for example.

The liquid ejection head 1 includes a liquid ejection unit 2 and an ink supply unit 3. Ink is supplied to the ink supply unit 3 from a liquid connection portion, which is connected to the buffer tank 1002. The ink supply unit 3 supplies ink to the liquid ejection unit 2 after letting the ink pass through in the order of the filter 31 and the inside of the negative pressure control unit 32. The negative pressure control unit 32 is a regulator mechanism in general and has a function of maintaining the inside of the downstream side thereof (that is, the liquid ejection unit side) to a preset constant negative pressure even in a case where the ink supply flow rate fluctuates in accordance with change in printing duty. Furthermore, the ink supply unit 3 once collects ink from the outlet of the liquid ejection unit 2 and then discharges the ink to the suction side of the circulating pump 1001.

Inside the liquid ejection unit 2, a print element substrate 10 and a flow path member 20 that supports the print element substrate 10 are laminated in the laminated direction (z-direction). The liquid ejection unit 2 receives ink supplied from the ink supply unit 3 and ejects ink based on a control signal from the electric wiring substrate 102 of the liquid ejection apparatus 100. A supply flow path 22 is provided in the flow path member 20. The upstream side of the supply flow path 22 is connected to the ink supply unit 3, and the downstream side of the supply flow path 22 is connected to the common flow path 21 of the print element substrate 10. That is, the supply flow path 22 includes a connection port connected to the ink supply unit 3 and a connection port connected to the common flow path 21. Furthermore, a collection flow path 23 is provided in the flow path member 20. The common flow path 21 is a flow path that is commonly connected to multiple pressure chambers 17. The upstream side of the collection flow path 23 is connected to the common flow path 21 of the print element substrate 10, and the downstream side of the collection flow path 23 communicates with the circulating pump 1001 via the ink supply unit 3. That is, the collection flow path 23 includes a connection port connected to the common flow path 21 and a connection port connected to the ink supply unit 3.

As illustrated in FIG. 3, each of the supply flow path 22 and the collection flow path 23 has an oblique flow path wall that is inclined relative to the laminated direction. Specifically, the flow path wall of the flow path member 20 forming the supply flow path 22 forms a slope that becomes nearer the collection flow path 23 as approaching the common flow path 21. Further, the flow path wall of the flow path member 20 forming the collection flow path 23 forms a slope that becomes nearer the supply flow path 22 as approaching the common flow path 21.

More specifically, as illustrated in FIG. 3, the flow path member 20 includes a wall portion 24 between the supply flow path 22 and the collection flow path 23 in the direction of ink flow in the flow path member 20, which is generated by driving of the circulating pump 1001 (hereinafter referred to as "ink flow direction"). The wall portion 24 includes a first wall 25 and a second wall 27. The supply flow path 22 is formed by the first wall 25 of the wall portion 24 and the third wall 26, which faces the first wall 25. The collection flow path 23 is formed by the second wall 27 and the fourth wall 28, which faces the second wall 27. Further, the first wall 25 and the third wall 26 are inclined relative to the laminated direction such that, compared to the inlet port of the supply flow path 22, the outlet port to the common flow path 21 is nearer the collection flow path side. The second wall 27 and the fourth wall 28 are inclined relative to the laminated direction such that, compared to the outlet port of the collection flow path 23, the inlet port from the common flow path 21 is nearer the supply flow path side.

Further, as illustrated in FIG. 3, the wall portion 24 extends nearer the print element substrate 10 side (ejection opening formed surface side) in the laminated direction (z-direction), compared to the third wall 26, which is the other wall that forms the supply flow path 22, and the fourth wall 28, which is the other wall that forms the collection flow path 23.

In a case where the circulating pump 1001 is driven in such a configuration as illustrated in FIG. 3, ink flows from the supply flow path 22 through the common flow path 21 into the collection flow path 23 (see the outlined white arrows in FIG. 3). That is, as illustrated in FIG. 3, ink flows in the ink flow direction. In a case where print operation is started, the flow rate in the supply flow path 22 increases or decreases in accordance with the image to be printed. However, the pressure on the inlet side of the supply flow path 22 is controlled by the negative pressure control unit 32 to be within a predetermined range of negative pressure regardless of change in the flow rate.

<Explanation of Print Element Substrate and Ink Circulation in Substrate>

Figure 4:
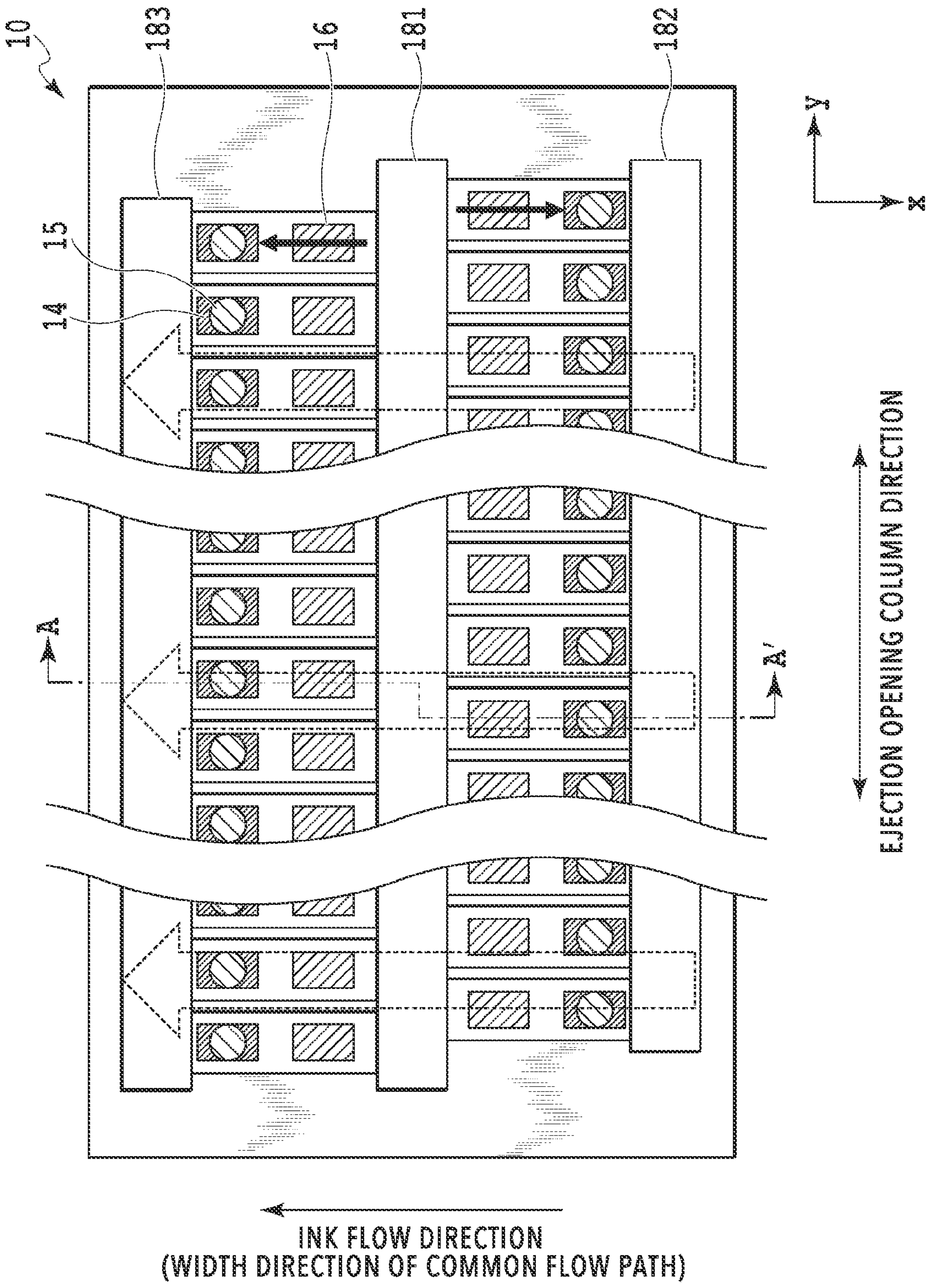
FIG. 4 is a schematic view illustrating a print element substrate.

FIG. 4 is a schematic view illustrating a print element substrate 10 in the present embodiment. An explanation is given of the print element substrate 10 and ink circulation in the print element substrate 10 with reference to FIG. 3 and FIG. 4. In the present embodiment, ink is ejected by a system in which the print element substrate 10 includes a heating resistance element as an energy generating element that generates energy utilized for ejecting a liquid so that the heating resistance element is used as a print element. Another system such as a system using a piezo element as a print element may be used as well.

The print element substrate 10 illustrated in FIG. 3 is a cross section taken along line A-A' in FIG. 4. In the print element substrate 10, a substrate 11, an intermediate layer 12, and an ejection opening formed layer 13 are laminated in that order from the flow path member 20 side. It is preferable that a photosensitive resin material is used as the material of the intermediate layer 12 and the ejection opening formed layer 13 and that an ejection opening 15 and an internal flow path are formed by a photolithography process.

As illustrated in FIG. 3 and FIG. 4, the substrate 11 is provided with ink communication ports (communication ports 181 through 183) to communicate with the common flow path 21, print elements 14, and pumps 16. In the ejection opening formed layer 13, an ejection opening 15 is formed at a position facing a print element 14 in the laminated direction. A print element 14 and a pump 16 perform ink ejection operation and ink circulation operation, based on signals from the electric wiring substrate 102 of the liquid ejection apparatus 100, respectively.

As illustrated in FIG. 3 and FIG. 4, each separate flow path, which includes an ejection opening 15 and a pressure chamber 17 that have liquid connection with a pump 16, is connected to the common flow path 21. In a case where a pump 16 is driven, ink in the common flow path 21 passes through a communication port 181, which is positioned in the vicinity of the intermediate part in the width direction of the common flow path 21, and through a pressure chamber 17 corresponding to the pump 16 and the print element 14 of each separate flow path. Then, a flow (as indicated by the black arrow lines in FIG. 3 and FIG. 4) that flows back to the common flow path 21 from another communication port (a communication port 182 or a communication port 183), which is positioned in the vicinity of an end portion of the width direction of the common flow path 21, is generated. Therefore, it is possible to discharge a foreign substance and thickened ink, which is generated due to moisture evaporation from an ejection opening 15, to the common flow path 21, by driving a pump 16 so as to generate an ink flow in an ejection opening 15 and a pressure chamber 17 in a non-printing state. The pump 16 may be anything as long as the pump 16 has a function of circulating ink through the pressure chamber 17. For example, it is possible to use a heating resistance element that is able to generate a bubble of ink, a piezo element, or an electrode element that generates an electroosmotic flow. In general, flow paths between communication ports are usually designed to be considerably small cross-sectional areas due to restriction on the size of an ejection liquid droplet for reducing granularity of an image, for example. For this reason, it is preferable that the circulation flow rate generated by a pump 16 is smaller than the maximum ejection flow rate per ejection opening, so that an excessive negative pressure is not applied to the meniscus of ink at the ejection opening 15.

On the other hand, to an ejection opening 15 and a pressure chamber 17 in an ejecting state, ink is supplied from the common flow path 21 via both communication ports (a communication port 181 and a communication port 182, or a communication port 181 and a communication port 183) in accordance with ink ejection operation. At this time, the circulation operation by the pump 16 is basically in the off state. The pump 16 is driven at a timing right before the print element 14 is driven for ejection based on a drive signal from the liquid ejection apparatus 100, so that concentrated/thickened ink stagnating in the ejection opening 15 and the pressure chamber 17 is discharged to the common flow path 21.

As described above, because of ink circulation by a pump 16, it is possible to prevent ejection from being ink non-discharge due to ink thickening in the vicinity of an ejection opening 15 and to remove bubbles or foreign substances. Therefore, it is possible to eject a desired liquid with less possibility of ink non-discharge, without performing such recovery operation with waste ink as preliminary ejection operation or cap suction operation. Thus, high-quality printing can be performed.

<Explanation of Ink Circulation After Stopping for a Long Period of Time>

In a case where a pump 16 has not been driven for a long period of time because the print element substrate 10 or the liquid ejection head 1 has been in a stopped state, an area of concentrated ink due to moisture evaporation from an ejection opening 15 is diffused. As a result, concentration/thickening may proceed to the ink in the communication ports 181 through 183 and the common flow path 21. In this case, even though the pump 16 is driven, the ink concentration/viscosity in the ejection opening 15 and the pressure chamber 17 does not recover, which causes a trouble in ejection operation.

In the present embodiment, the common flow path 21 in the print element substrate 10 has liquid connection with multiple flow paths (that is, the supply flow path 22 and the collection flow path 23) used for ink circulation with the outside of the print element substrate 10. That is, the supply flow path 22 and the collection flow path 23 formed in the flow path member 20 have liquid connection with the same common flow path 21. Further, in a case where a pump 16 provided in a print element substrate 10 is a first pump, the liquid ejection apparatus includes the circulating pump 1001 as the second pump at a position different from the print element substrate 10. In the present embodiment, such two different pumps function synergistically, so as to perform preferable circulation in the entire liquid ejection apparatus. Specifically, in addition to the circulation generated by the first pump (pump 16) as described above, the circulating pump 1001, which is the second pump, generates a flow of liquid in the upstream side of the circulation flow path for the circulation generated by the first pump, that is, in the order of the supply flow path 22, the common flow path 21, and the collection flow path 23. With such a configuration, in the upstream side of the circulation flow path for the circulation generated by the first pump, concentrated ink in the common flow path 21, or the like, is pushed away by non-concentrated ink supplied from the supply flow path 22 by the circulating pump 1001, which is the second pump. As a result, it is possible to discharge concentrated ink from the collection flow path 23. That is, by driving the circulating pump 1001 to circulate ink between the buffer tank 1002 and the liquid ejection head 1, it is possible to generate an ink flow in the common flow path 21 (as indicated by the outlined white arrows in FIG. 3 and FIG. 4). With the ink flow, it is possible to recover concentration and viscosity of ink in the common flow path 21 to a normal state. The ink volumes in the buffer tank 1002 and in the ink supply unit 3 are usually sufficiently larger than the ink volume in the print element substrate 10. Therefore, even though the recovery process by the circulation operation is performed, there is only a slight increase of concentration as a whole, and the effect on the quality of printed images is sufficiently small.

The ink flow can be generated by the circulating pump 1001 continuously or intermittently during print operation, not just after stopping for a long period of time. For example, usage for ink having a high pigment precipitation speed, such as white ink, is more effective.

In the present embodiment, as illustrated in FIG. 3, a part of the partition (wall portion 24) between the supply flow path 22 and the collection flow path 23 of the flow path member 20 protrudes into the common flow path 21 so as to be disposed in the vicinity of the communication port 181, which serves as an inlet port to a pump 16. That is, the wall portion 24 is positioned nearer the ejection opening formed surface in the laminated direction, compared to the bonding surface between the print element substrate 10 and the flow path member 20. Further, each of the supply flow path 22 and the collection flow path 23 has a slope that continues from the protruding portion. That is, the connection ports, which are formed in the supply flow path 22 and the collection flow path 23 to be connected to the common flow path 21, are connected to oblique flow path walls having an acute angle relative to the direction intersecting the array direction in which the ejection openings 15 are aligned. With such a shape as described above, ink from the supply flow path 22 flows preferentially into the vicinity of the inlet port of the pump 16 (that is, in the vicinity of the communication port 181).

Although the present embodiment is a mode in which all of the first wall 25, the second wall 27, the third wall 26, and the fourth wall 28 form slopes, respectively, the present embodiment is not limited to this example. For example, there may be a mode in which only the first wall 25 forms a slope and the other walls are vertical walls. In a case where the first wall 25 that forms the supply flow path 22 is a vertical wall, a stagnation portion may occur at a portion where an ink flow from the supply flow path 22 is bent. As a result, it becomes difficult for non-concentrated ink to flow into the vicinity of the inlet port of the pump 16 in the common flow path 21, and therefore it takes time to discharge concentrated ink after the circulating pump 1001 is driven. On the other hand, in a case where the first wall 25 forms a slope, ink flows preferentially into the vicinity of the inlet port of the pump 16 as described above. Therefore, the concentration and viscosity of the ink supplied to the pump 16 can be reduced in a short period of time, and the downtime after stopping for a long period of time until a restart of ejection operation can be shortened.

As illustrated in FIG. 3, it is preferable that the second wall 27 is also a slope. This is because, in a case where the second wall 27 is a slope, a stagnation portion is less likely to occur, compared to a case in which the second wall 27 is a vertical wall, and thus it is possible to discharge concentrated ink efficiently. Moreover, as illustrated in FIG. 3, it is preferable that the third wall 26 and the fourth wall 28 are also slopes. This is because, in a case where the third wall 26 and the fourth wall 28 are slopes, the flow becomes stronger because of the rectifying effect, and thus it is possible to improve the efficiency of replacing ink in the common flow path 21.

Although the supply flow path 22 and the collection flow path 23 are in symmetrical shapes in the explanation of the example of FIG. 3, the present embodiment is not limited to the example. The supply flow path 22 and the collection flow path 23 may have different shapes.

Although the present embodiment is a mode in which the liquid ejection apparatus 100 is an apparatus that circulates ink between the buffer tank 1002 and the liquid ejection head 1, there may be other modes. For example, there may be a mode in which, instead of circulating ink, two tanks are provided on the upstream side and the downstream side of a liquid ejection head. Further, by repeating operation of flowing ink from the upstream to the downstream or from the downstream to the upstream, it is possible to obtain the same effect as well. That is, as for a time other than print operation, there may be a mode in which ink moves in a single direction by circulation or a mode in which ink reciprocally moves in the forward direction and the opposite direction. In such a case where ink reciprocally moves, it is preferable that the shape of the supply flow path 22 and the shape of the collection flow path 23 are symmetric.

In addition, the liquid ejection apparatus according to the present embodiment includes the replenishing pump 1003 as the third pump, which is different from the first pump (pump 16) and the second pump (circulating pump 1001). Since the liquid ejection apparatus includes the replenishing pump 1003 as the third pump, a flow of liquid is generated in the order of the main tank 1004, the supply flow path 22, the common flow path 21, and the collection flow path 23.

Second Embodiment

In the first embodiment, the configuration in which ink is circulated between the buffer tank 1002 and the liquid ejection head 1 by the buffer tank 1002 and the circulating pump 1001 provided outside the liquid ejection head 1 is taken as an example for the explanation. In the present embodiment, an explanation is given of a configuration in which the buffer tank 1002 is not provided outside the liquid ejection head 1 and ink is circulated inside the liquid ejection head 1. In the following explanation, parts that are different from the first embodiment are mainly explained, and the explanation of the parts that are the same as those in the first embodiment are omitted.

Figure 5:
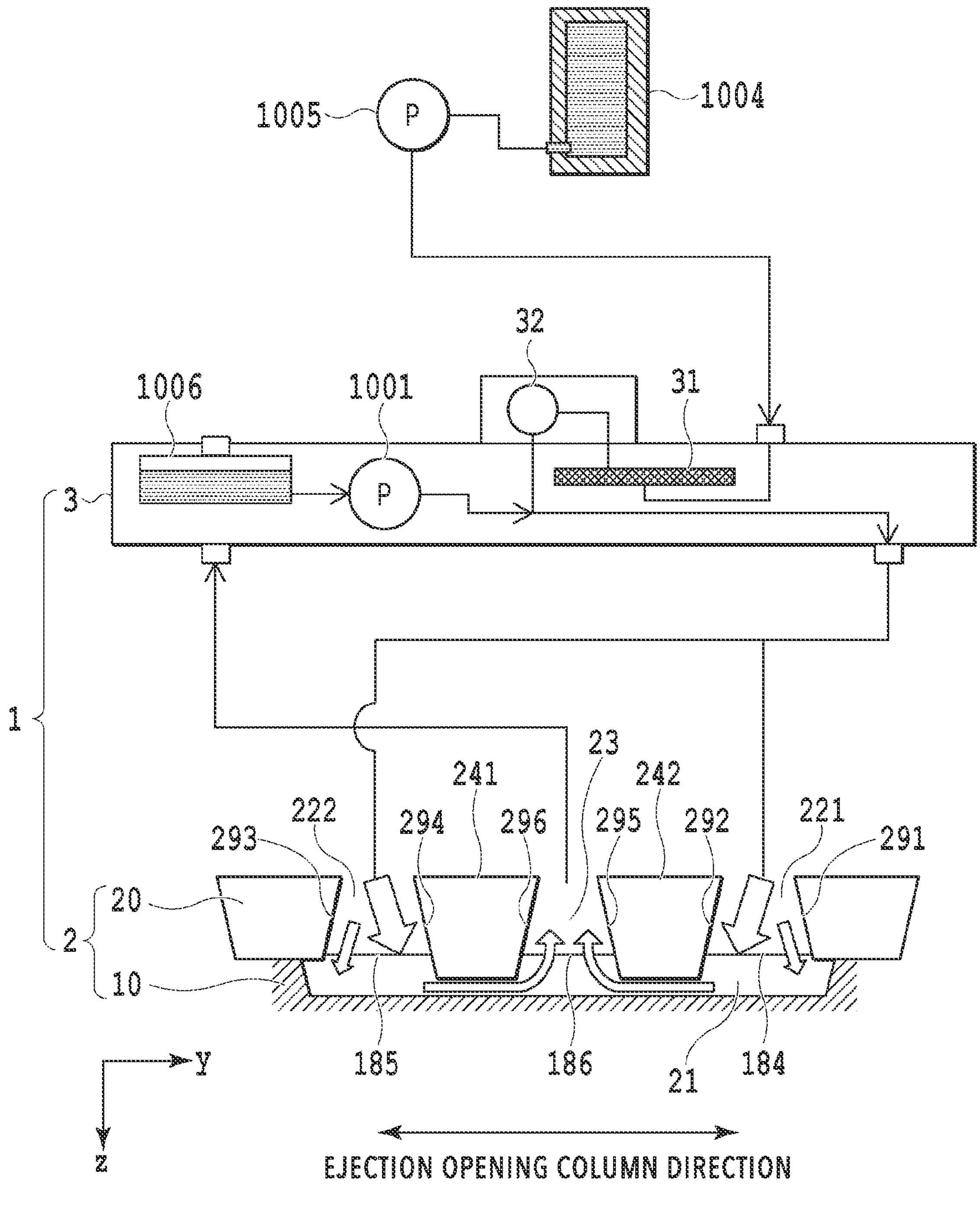
FIG. 5 is a schematic view illustrating a liquid ejection head and an ink circulation path.

FIG. 5 is a schematic view illustrating an ink path corresponding to one color in the liquid ejection apparatus and the liquid ejection head 1 of the present embodiment, in which the liquid ejection head 1 is connected to the pressure pump 1005 and the main tank 1004.

Unlike the first embodiment, ink is pressurized and supplied from the main tank 1004 by the pressure pump 1005. Further, the ink supply unit 3 in the liquid ejection head 1 includes a built-in circulating pump 1001 and air buffer 1006. The air buffer 1006 and the circulating pump 1001 are connected to the collection flow path 23 of the liquid ejection unit 2 in that order. The purpose and effect of driving the circulating pump 1001 are the same as those in the first embodiment, and ink is circulated between the ink supply unit 3 and the liquid ejection unit 2 by driving the circulating pump 1001. Here, because of the action of the negative pressure control unit 32, the pressure in the vicinity of the junction of the downstream of the circulating pump 1001 and the downstream of the negative pressure control unit 32 is maintained within a preset constant range of negative pressure. In addition, the pressure in the air buffer

1006 is lowered by the pump head pressure difference of the circulating pump 1001 in accordance with the flow rate in the circulating pump 1001.

The air buffer 1006 includes an outside air communication hole and an openable valve (not illustrated in FIG. 5). The air buffer 1006 is able to discharge bubbles, which are discharged from the liquid ejection unit 2 by circulation, to the outside. In a case where ink is consumed in the liquid ejection unit 2 because of print operation or suction recovery, the consumed amount of ink is replenished from the main tank 1004 through the pressure pump 1005 and the negative pressure control unit 32 to the liquid ejection unit 2.

Figure 6:
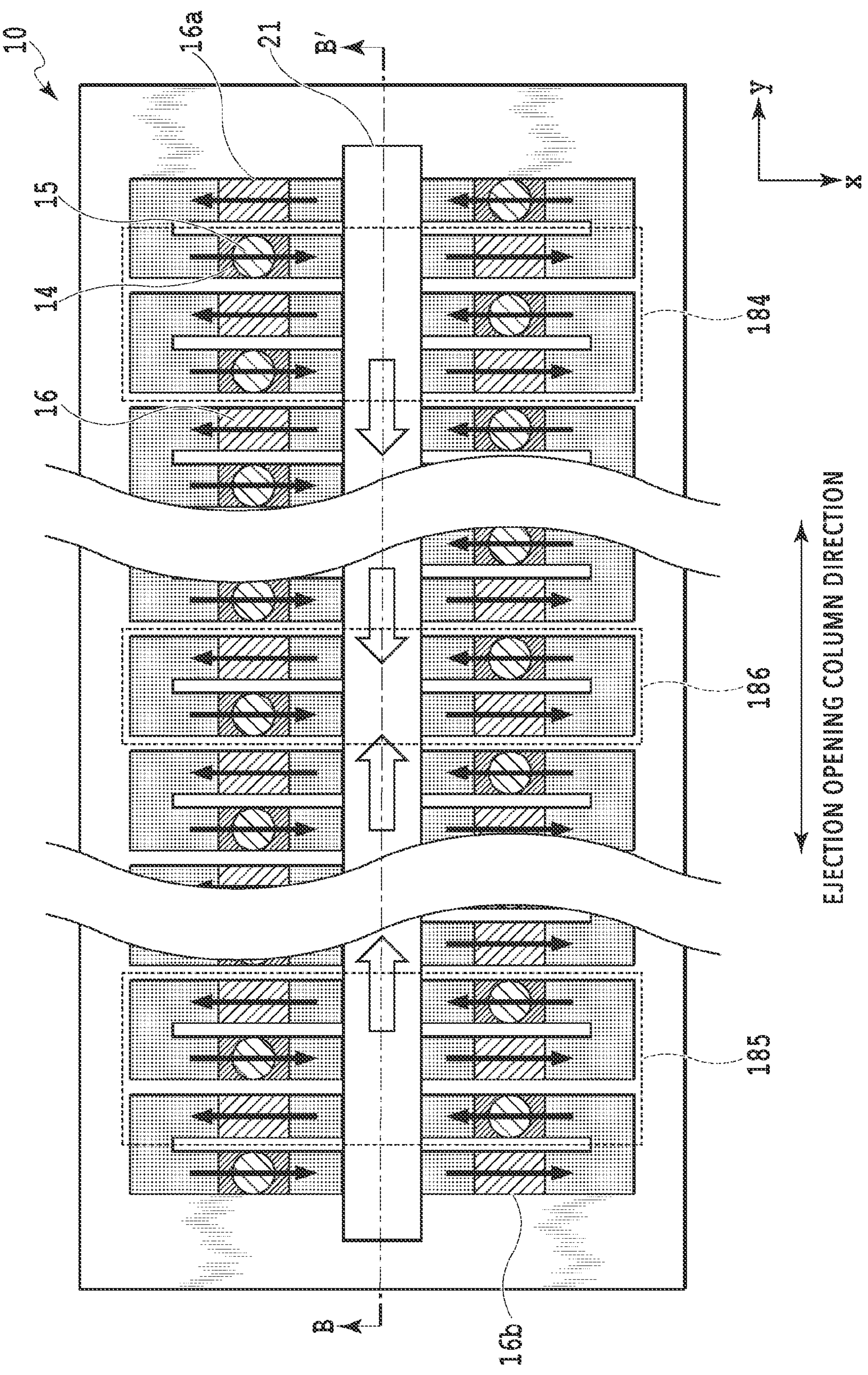
FIG. 6 is a schematic view illustrating a print element substrate.

FIG. 6 is a schematically illustrated top view of a print element substrate 10. As illustrated in FIG. 6, the pumps 16 are disposed in the same array as the ejection openings 15 (that is, the print elements 14) in the array direction (also referred to as the ejection opening array direction), in which the ejection openings 15 are disposed in line. According to such a configuration, electrical wiring can be simplified. In the present embodiment, the common flow path 21 is a flow path extending in the ejection opening array direction (y-direction). The pumps 16 suction ink from the common flow path 21 and generate ink flows (as indicated by the black arrows in FIG. 6) that flow through the separate flow paths, each of which is a U-shaped flow path, to the print elements 14 and the ejection openings 15.

The common flow path 21 communicates with a first supply flow path 221 and a second supply flow path 222 of the flow path member 20 through a communication port 184 and a communication port 185, respectively. Further, the common flow path 21 communicates with the collection flow path 23 of the flow path member 20 via a communication port 186. The print element substrate 10 in FIG. 5 is a cross sectional view taken along line B-B' of FIG. 6. An ink circulatory flow generated by the circulating pump 1001 is indicated by the outlined white arrows in FIG. 5 and FIG. 6. As described above, the connection ports, which are formed in the first supply flow path 221, the second supply flow path 222, and the collection flow path 23 to be connected to the common flow path 21, are disposed apart from each other in the extending direction of the common flow path 21.

In the present embodiment, the first supply flow path 221, the second supply flow path 222, and the collection flow path 23, which are formed in the flow path member 20, have liquid connection with the same common flow path 21 as well. Further, in a case where a pump 16 provided in the print element substrate 10 is a first pump, the liquid ejection apparatus includes the circulating pump 1001 as the second pump at a position different from the print element substrate 10. Specifically, in the present embodiment, the circulating pump 1001 is provided inside the liquid ejection head. Since the liquid ejection apparatus includes the circulating pump 1001 as the second pump, a flow of liquid is generated in the order of the supply flow paths (the first supply flow path 221 and the second supply flow path 222), the common flow path 21, and the collection flow path 23. With such a configuration, concentrated ink in the common flow path 21, which is positioned in the upstream of the circulation flow path for circulation generated by the first pump, is pushed away by non-concentrated ink supplied from the supply flow paths by the circulating pump 1001, which is the second pump, for example. As a result, it is possible to discharge concentrated ink from the collection flow path 23.

In addition, the liquid ejection apparatus according to the present embodiment includes the pressure pump 1005 as the third pump, which is different from the first pump (pump 16) and the second pump (circulating pump 1001). Since the liquid ejection apparatus includes the pressure pump 1005 as the third pump, a flow of liquid is generated in the order of the main tank 1004, the supply flow paths (the first supply flow path 221 and the second supply flow path 222), the common flow path 21, and the collection flow path 23.

As illustrated in FIG. 5 and FIG. 6, the circulatory flow of ink generated by the circulating pump 1001 flows from both end portions of the common flow path 21 (end portions in the ejection opening array direction of the print element substrate 10) toward the central portion of the common flow path 21 (the central portion of the print element substrate 10 in the ejection opening array direction).

As illustrated in FIG. 5, the partition 242 between the first supply flow path 221 and the collection flow path 23 and the partition 241 between the second supply flow path 222 and the collection flow path 23 have shapes that protrude into the common flow path 21. As with the first embodiment, the purpose and effect thereof are improvement of the efficiency of replacing concentrated/thickened ink in the common flow path. For example, since the partition 241 and the partition 242 protrude into the common flow path 21, it is possible to let fresh ink (non-concentrated ink) pass by as close to the liquid intake (inlet) of a pump 16 in the common flow path 21 as possible. Further, since the partition 241 and the partition 242 protrude into the common flow path 21, the flow path area of the common flow path 21 is reduced. Thus, since the speed of an ink flow becomes higher, the efficiency of replacement is improved.

Further, in the present embodiment, as illustrated in FIG. 5, the flow path walls of the first supply flow path 221 and the second supply flow path 222 are present such that a part of the ink flow flowing in from the first supply flow path 221 and the second supply flow path 222 is directed toward the ejection openings positioned at the end portions of the ejection opening array. That is, each of the connection ports, which are formed in the first supply flow path 221 and the second supply flow path 222 to be connected to the common flow path 21, extends along the extending direction (ejection opening array direction), in which the common flow path 21 extends.

More specifically, as illustrated in FIG. 5, the first supply flow path 221 is formed by the fifth wall 291, which is on an end portion side in the ejection opening array direction, and the sixth wall 292, which is on the collection flow path 23 side in the ejection opening array direction. Further, the fifth wall 291 forms a slope in the laminated direction, such that, compared to the inlet port of the first supply flow path 221, the outlet port to the common flow path 21 is nearer the end portion side (farther from the collection flow path 23) in the ejection opening array direction. Contrarily, the sixth wall 292 forms a slope in the laminated direction, such that, compared to the inlet port of the first supply flow path 221, the outlet port to the common flow path 21 is nearer the collection flow path 23 in the ejection opening array direction.

Further, the second supply flow path 222 is formed by the seventh wall 293, which is on an end portion side in the ejection opening array direction, and the eighth wall 294, which is on the collection flow path 23 side in the ejection opening array direction. Further, the seventh wall 293 forms a slope in the laminated direction, such that, compared to the inlet port of the second supply flow path 222, the outlet port to the common flow path 21 is nearer the end portion side in the ejection opening array direction. The eighth wall 294 forms a slope in the laminated direction, such that, compared to the inlet port of the second supply flow path 222, the outlet port to the common flow path 21 is nearer the collection flow path 23 in the ejection opening array direction.

With such shapes, the ink flow from the first supply flow path 221 and the second supply flow path 222 flows around the end portions of the common flow path 21. That is, because of the shape of a slope of the fifth wall 291, it is made easier for the ink flow from the first supply flow path 221 to flow into the pump 16*a*, which is positioned on the opposite side of the collection flow path 23 in the ejection opening array direction. Further, because of the shape of a slope of the seventh wall 293, it is made easier for the ink flow from the second supply flow path 222 to flow into the pump 16*b*, which is positioned on the opposite side of the collection flow path 23 in the ejection opening array direction. Therefore, the concentration and viscosity of the ink supplied to the pump 16 can be reduced in a short period of time, and the downtime after stopping for a long period of time until a restart of ejection operation can be shortened.

Furthermore, the collection flow path 23 is formed by the ninth wall 295, which is on the first supply flow path 221 side, and the tenth wall 296, which is on the second supply flow path 222 side. Further, the ninth wall 295 forms a slope in the laminated direction, such that, compared to the outlet port of the collection flow path 23, the inlet port from the common flow path 21 is nearer the first supply flow path 221 in the ejection opening array direction. Moreover, the tenth wall 296 forms a slope in the laminated direction, such that, compared to the outlet port of the collection flow path 23, the inlet port from the common flow path 21 is nearer the second supply flow path 222 in the ejection opening array direction. That is, at least a part of the connection ports, which are formed in the first supply flow path 221, the second supply flow path 222, and the collection flow path 23 to be connected to the common flow path 21, is connected to an oblique flow path wall having an acute angle relative to the array direction in which the ejection openings 15 are aligned.

In this way, by forming slopes in the first supply flow path 221, the second supply flow path 222, and the collection flow path 23, it is possible to prevent a flow stagnation area from occurring or to improve the efficiency of replacing concentrated ink by the rectifying effect.

Other Embodiments

In the first embodiment, an explanation has been given of the configuration in which such a liquid ejection head 1 as illustrated in FIG. 3 and FIG. 4 is applied to the mode in which ink is circulated between the buffer tank 1002 and the liquid ejection head 1. Further, in the second embodiment, an explanation is given of the configuration in which such a liquid ejection head 1 as illustrated in FIG. 5 and FIG. 6 is applied to the mode in which ink is circulated inside the liquid ejection head 1. However, combinations of a circulation configuration and a liquid ejection head configuration are not limited to the combinations described above. For example, there may be a mode in which such a liquid ejection head 1 as illustrated in FIG. 5 and FIG. 6 is applied to the mode in which ink is circulated between the buffer tank 1002 and the liquid ejection head 1 as explained in the first embodiment. Further, there may be a mode in which such a liquid ejection head 1 as illustrated in FIG. 3 and FIG. 4 is applied to the mode in which ink is circulated inside the liquid ejection head 1 as explained in the second embodiment.

Moreover, in FIG. 3 and FIG. 4, an explanation has been given of the example in which one set of a supply flow path 22 and a collection flow path 23 has liquid connection with one common flow path 21. However, the embodiment is not limited to the example. Multiple common flow paths and one pair of a supply flow path and a collection flow path corresponding to the common flow paths may be provided in the liquid ejection head 1. Further, as illustrated in FIG. 5 and FIG. 6, a pair of multiple supply flow paths and one collection flow path may be arranged for one common flow path 21. Alternatively, multiple collection flow paths may be arranged for one common flow path. In addition, multiple supply flow paths and multiple collection flow paths may be arranged for one common flow path 21.

Further, in the above-described embodiments, an explanation has been given of the mode in which a time for decreasing ink concentration and viscosity is shortened by circulation operation performed by the circulating pump 1001. Further, it has been explained that waste ink can thereby be reduced as preliminary ejection operation or cap suction operation is not performed. However, it is also possible that the liquid ejection apparatus is configured to be able to perform preliminary ejection operation and cap suction operation.

According to the present disclosure, even after a long period of time being in a state in which ejection is not performed, it is possible to eject a desired liquid from an ejection opening.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-248110, filed Dec. 28, 2018, which is hereby incorporated by reference herein in its entirety.

What is claimed is:

1. A liquid ejection head comprising:

an ejection opening forming member having a plurality of ejection openings being configured to eject liquid; and an element substrate having elements configured to generate energy to eject liquid from the ejection openings, wherein the element substrate includes:

a plate portion having a first surface and a second surface, the second surface being opposite to the first surface, pressure chambers configured in such a way that pressure to eject the liquid by the elements is applied and provided on a side of the first surface, a supply flow path and a collection flow path which are openings penetrating through the first surface and the second surface of the plate portion, a common flow path provided on a side of the second surface of the plate portion and fluidically connected with the supply flow path and the collection flow path, and pumps, provided on the side of the first surface, configured to generate liquid flow, wherein the liquid flows in an order of the common flow path, the supply flow path, the pressure chamber, the collection flow path, and the common flow path, wherein the collection flow path and the supply flow path are positioned across an ejection opening array, in which the plurality of ejection openings are aligned, in a direction intersecting the ejection opening array, and wherein, in a planar view of the element substrate, the supply flow path, the pumps, the elements, and the collection flow path are positioned in the listed order in a direction intersecting the ejection opening array.

2. The liquid ejection head according to claim 1, wherein at least two ejection opening arrays in which the ejection openings are aligned are provided and the ejection openings of two ejection opening arrays are positioned so as to be displaced from each other in a direction orthogonal to a direction in which the ejection opening arrays extend.

3. The liquid ejection head according to claim 1, wherein a plurality of ejection opening arrays are in fluid communication with the common flow path.

4. The liquid ejection head according to claim 1, wherein a first ejection opening array and a second ejection opening array are in fluid communication with the common flow path.

5. The liquid ejection head according to claim 4, wherein in the planar view of the element substrate, the collection flow path, the first ejection opening array, the supply flow path, the second ejection opening array, and the collection flow path are positioned in the listed order in a direction orthogonal to a direction in which the ejection opening arrays extend.

6. The liquid ejection head according to claim 1, wherein the pumps are configured to circulate liquid between the common flow path and the pressure chambers.

7. The liquid ejection head according to claim 1, wherein a circulation flow rate generated by each of the pumps is configured to be lower than a maximum ejection flow rate per ejection opening.

8. The liquid ejection head according to claim 1, wherein each of the pumps is driven in a case in which a corresponding element configured to generate energy is not driven.

* * * * *